(12) United States Patent
Allen, IV et al.

(10) Patent No.: US 12,458,425 B2
(45) Date of Patent: Nov. 4, 2025

(54) THERMAL HEATING ELEMENT FOR USE WITH ENDOMETRIAL ABLATION

(71) Applicant: Covidien LP, Mansfield, MA (US)

(72) Inventors: James D. Allen, IV, Broomfield, CO (US); William E. Robinson, Boulder, CO (US)

(73) Assignee: Covidien LP, Mansfield, MA (US)

( * ) Notice: Subject to any disclaimer, the term of this patent is extended or adjusted under 35 U.S.C. 154(b) by 674 days.

(21) Appl. No.: 17/862,885

(22) Filed: Jul. 12, 2022

(65) Prior Publication Data

US 2024/0016534 A1     Jan. 18, 2024

(51) Int. Cl.
*A61B 18/08* (2006.01)
*A61B 18/00* (2006.01)
*H05B 3/06* (2006.01)

(52) U.S. Cl.
CPC ............. *A61B 18/082* (2013.01); *H05B 3/06* (2013.01); *A61B 2018/00095* (2013.01); *A61B 2018/00101* (2013.01); *A61B 2018/00232* (2013.01); *A61B 2018/00559* (2013.01); *A61B 2018/00577* (2013.01); *H05B 2203/013* (2013.01); *H05B 2203/017* (2013.01)

(58) Field of Classification Search
None
See application file for complete search history.

(56) References Cited

U.S. PATENT DOCUMENTS

| | | | |
|---|---|---|---|
| 3,324,847 A | 6/1967 | Zoumboulis |
| 3,369,549 A | 2/1968 | Armao |
| 3,645,265 A | 2/1972 | Majzlin |
| 3,750,653 A | 8/1973 | Simon |
| 3,789,829 A | 2/1974 | Hasson |
| 3,840,016 A | 10/1974 | Lindemann |
| 3,901,224 A | 8/1975 | Bucalo |
| 3,924,628 A | 12/1975 | Droegemueller et al. |
| 3,934,580 A | 1/1976 | Cournut |
| 4,016,270 A | 4/1977 | Pharriss et al. |
| 4,160,455 A | 7/1979 | Law |
| 4,198,981 A | 4/1980 | Sinnreich |
| 4,292,960 A | 10/1981 | Paglione |
| 4,296,760 A | 10/1981 | Carlsson et al. |
| 4,311,154 A | 1/1982 | Sterzer et al. |

(Continued)

*Primary Examiner* — Linda C Dvorak
*Assistant Examiner* — Nicholas S Borsch
(74) *Attorney, Agent, or Firm* — Carter, DeLuca & Farrell LLP (57) ABSTRACT

A device for endometrial ablation includes a selectively expandable bladder configured for insertion through a cervical canal of a patient and into a patient's cervix. The selectively expandable bladder defines an interior volume for receiving a thermally conductive medium which, when introduced into the interior volume, expands the selectively expandable bladder against the uterine tissue of the cervix. One or more insulative substrates is operably disposed within the interior volume and supports a thermal assembly on the one or more insulative substrates. The thermal assembly couples to an energy source and is configured to conduct thermal energy to a thermally conductive substrate upon activation of the thermal assembly, which, in turn, heats the thermally conductive medium in contact with the thermally conductive substrate to treat the uterine tissue of a patient.

18 Claims, 7 Drawing Sheets

(56) References Cited

U.S. PATENT DOCUMENTS

| | | |
|---|---|---|
| 4,349,033 A | 9/1982 | Eden |
| 4,375,220 A | 3/1983 | Matvias |
| 4,377,168 A | 3/1983 | Rzasa et al. |
| 4,409,993 A | 10/1983 | Furihata |
| 4,469,103 A | 9/1984 | Barrett |
| 4,491,131 A | 1/1985 | Vassiliadis |
| 4,494,539 A | 1/1985 | Zenitani et al. |
| 4,549,533 A | 10/1985 | Cain et al. |
| 4,552,127 A | 11/1985 | Schiff |
| 4,572,190 A | 2/1986 | Azam et al. |
| 4,622,972 A | 11/1986 | Giebeler, Jr. |
| 4,638,436 A | 1/1987 | Badger et al. |
| 4,658,836 A | 4/1987 | Turner |
| 4,662,383 A | 5/1987 | Sogawa et al. |
| 4,674,481 A | 6/1987 | Boddie, Jr. et al. |
| 4,692,452 A | 9/1987 | Cerny et al. |
| 4,700,701 A | 10/1987 | Montaldi |
| 4,754,752 A | 7/1988 | Ginsburg et al. |
| 4,754,757 A | 7/1988 | Feucht |
| 4,758,592 A | 7/1988 | Horrobin et al. |
| 4,771,778 A | 9/1988 | Mar |
| 4,773,899 A | 9/1988 | Spears |
| 4,776,349 A | 10/1988 | Nashef et al. |
| 4,818,954 A | 4/1989 | Flachenecker et al. |
| 4,823,812 A | 4/1989 | Eshel et al. |
| 4,836,189 A | 6/1989 | Allred et al. |
| 4,852,579 A | 8/1989 | Gilstad et al. |
| 4,860,752 A | 8/1989 | Turner |
| 4,865,047 A | 9/1989 | Chou et al. |
| 4,927,413 A | 5/1990 | Hess |
| 4,935,003 A | 6/1990 | Gainutdinova et al. |
| 4,938,217 A | 7/1990 | Lele |
| 4,946,440 A | 8/1990 | Hall |
| 4,949,718 A | 8/1990 | Neuwirth et al. |
| 4,955,377 A | 9/1990 | Lennox et al. |
| 4,960,109 A | 10/1990 | Lele |
| 4,961,435 A | 10/1990 | Kitagawa et al. |
| 4,967,765 A | 11/1990 | Turner et al. |
| 4,974,587 A | 12/1990 | Turner et al. |
| 4,979,948 A | 12/1990 | Geddes et al. |
| 4,985,027 A | 1/1991 | Dressel |
| 4,993,430 A | 2/1991 | Shimoyama et al. |
| 4,997,653 A | 3/1991 | Igarashi |
| 4,998,930 A | 3/1991 | Lundahl |
| 5,003,991 A | 4/1991 | Takayama et al. |
| 5,006,119 A | 4/1991 | Acker et al. |
| 5,026,959 A | 6/1991 | Ito et al. |
| 5,032,124 A | 7/1991 | Menton |
| 5,035,694 A | 7/1991 | Kasprzyk et al. |
| 5,041,089 A | 8/1991 | Mueller et al. |
| 5,045,056 A | 9/1991 | Behl |
| 5,047,025 A | 9/1991 | Taylor et al. |
| 5,050,597 A | 9/1991 | Daikuzono |
| 5,057,106 A | 10/1991 | Kasevich et al. |
| 5,059,191 A | 10/1991 | Beyer et al. |
| 5,084,044 A | 1/1992 | Quint |
| 5,092,841 A | 3/1992 | Spears |
| 5,098,429 A | 3/1992 | Sterzer |
| 5,100,388 A | 3/1992 | Behl et al. |
| 5,277,201 A * | 1/1994 | Stern ..................... A61B 18/14 606/41 |
| 5,443,470 A | 8/1995 | Stern et al. |
| 7,160,298 B2 | 1/2007 | Lawes et al. |
| 8,574,229 B2 | 11/2013 | Eder et al. |
| 8,753,333 B2 | 6/2014 | Johnson et al. |
| 8,814,865 B2 | 8/2014 | Reschke |
| 10,610,289 B2 | 4/2020 | Jensen |
| 11,000,328 B2 | 5/2021 | Batchelor et al. |
| 2004/0006340 A1 | 1/2004 | Latterell et al. |
| 2007/0078452 A1 | 4/2007 | Sekino |
| 2008/0033524 A1* | 2/2008 | Gale ..................... A61F 2/958 606/108 |
| 2012/0059372 A1 | 3/2012 | Johnson |
| 2013/0012934 A1 | 1/2013 | Manwaring et al. |
| 2014/0214030 A1 | 7/2014 | Horlle |
| 2015/0374430 A1 | 12/2015 | Weiler et al. |
| 2016/0143687 A1 | 5/2016 | Hart et al. |
| 2018/0333192 A1* | 11/2018 | Sliwa ..................... A61B 18/04 |
| 2019/0183565 A1 | 6/2019 | Artale et al. |
| 2020/0107880 A1 | 4/2020 | Drochner et al. |
| 2021/0022798 A1 | 1/2021 | Hammerland |
| 2021/0244464 A1 | 8/2021 | Zhao |
| 2021/0244465 A1 | 8/2021 | Zhao et al. |
| 2021/0307812 A1 | 10/2021 | Allen, IV et al. |
| 2022/0079658 A1 | 3/2022 | Allen, IV |
| 2022/0241005 A1 | 8/2022 | Netzel et al. |

* cited by examiner

THERMAL HEATING ELEMENT FOR USE WITH ENDOMETRIAL ABLATION

FIELD

The present disclosure relates to surgical instruments and, more particularly, to electrosurgical instruments and methods for treating tissue the endometrium using thermal energy.

BACKGROUND

Destroying the inner lining of a woman's uterus provides an alternative to the removal of the uterus by hysterectomy (or partial hysterectomy) as a potential treatment for disease and/or abnormal tissue conditions. Various techniques include radiofrequency ablation, chemical treatment, microwave heating, cryotherapy, laser therapy, etc. By and large, these treatments are applied to small areas successively and are time consuming. Other techniques have been developed that involve inserting a balloon-like element into the uterine cavity having an array of electrode disposed about an outer peripheral surface thereof. As the balloon is filled with a thermally conductive liquid and expands, the electrodes spread against the interior uterine wall. The electrodes evenly transfer heat and energy to the conductive fluid to treat the tissue.

Although these balloon-like devices work well for their intended purposes they still require some level of feedback control and require a significant number of electrodes to evenly heat the conductive fluid along the interior uterine walls to properly treat the tissue

SUMMARY

As used herein, the term "distal" refers to the portion that is being described which is further from a user, while the term "proximal" refers to the portion that is being described which is closer to a user. Further, to the extent consistent, any or all of the aspects detailed herein may be used in conjunction with any or all of the other aspects detailed herein.

Provided in accordance with aspects of the present disclosure is a device for endometrial ablation which includes a device for endometrial ablation having a selectively expandable bladder configured for insertion through a cervical canal of a patient and into a patient's cervix, the selectively expandable bladder defining an interior volume for receiving a thermally conductive medium for expanding the selectively expandable bladder against the uterine tissue of the cervix. One or more insulative substrates is operably disposed within the interior volume and is configured to support a thermal assembly on the one or more insulative substrates. The thermal assembly is adapted to couple to an energy source and is configured to conduct thermal energy to a thermally conductive substrate upon activation of the thermal assembly, which, in turn, heats the thermally conductive medium in contact with the thermally conductive substrate to treat the uterine tissue of a patient.

In aspects according to the present disclosure, the thermally conductive medium is heated to a temperature within the range of about 45° C. to about 90° C. for a specified time period.

In aspects according to the present disclosure, the thermally conductive medium is heated to a temperature within the range of about 55° C. to about 65° C. for about 10 minutes.

In aspects according to the present disclosure, the thermal assembly includes one or more resistive elements in thermal communication with the thermally conductive substrate and electrical communication with the energy source. In other aspects according to the present disclosure, the one or more resistive elements includes one or more traces composed of aluminum, copper, silver, chromium, titanium, stainless steel, nickel, chrome, tin, platinum, palladium, gold, nichrome, and a ferritic iron-chromium-aluminum alloy. In yet other aspects according to the present disclosure, the one or more traces is layered and electrically encapsulated atop an insulator operably coupled to the thermally conductive substrate. In still other aspects according to the present disclosure, the one or more resistive elements includes two or more traces layered atop one another and electrically encapsulated atop an insulator operably coupled to the thermally conductive substrate. In other aspects according to the present disclosure, the one or more traces is layered atop an insulator operably coupled to the thermally conductive substrate using sputtering, thermal evaporation, thermal spraying, cathodic arcing, pulsed laser deposition, electroplating, shadow masking or electron beam deposition.

In aspects according to the present disclosure, two or more insulative substrates are disposed within the interior volume and cooperate with a multiplexer or control algorithm to heat the thermally conductive medium. In other aspects according to the present disclosure, the shape or size of each insulative substrate is different to customize the treatment effect.

Provided in accordance with aspects of the present disclosure is a method for treating endometriosis which includes: inserting an expandable bladder into a cervical canal of a patient in a collapsed condition and into a patient's cervix; introducing a thermally conductive medium into an interior volume of the expandable bladder to expand the bladder against the interior walls of the uterine lining of a patient; and activating an energy source to energize a thermal assembly to conduct thermal energy to one or more insulative substrates disposed within the interior volume of the expandable bladder including a thermally conductive substrate such that thermal energy is transferred to the conductive medium in contact with the thermally conductive substrate to treat the uterine tissue.

In aspects according to the present disclosure, the method further includes heating the conductive medium to a temperature within the range of about 45° C. to about 90° C. for a specified time period.

In aspects according to the present disclosure, the method further includes heating the conductive medium to a temperature within the range of about 55° C. to about 65° C. for about 10 minutes.

In aspects according to the present disclosure, the thermal assembly includes one or more resistive elements in thermal communication with the thermally conductive substrate and electrical communication with the energy source.

In aspects according to the present disclosure, the resistive element includes one or more traces composed of aluminum, copper, silver, chromium, titanium, stainless steel, nickel, chrome, tin, platinum, palladium, gold, nichrome, and a ferritic iron-chromium-aluminum alloy.

In aspects according to the present disclosure, the thermal assembly includes one or more traces, and the method further includes layering and electrically encapsulating the one or more traces atop an insulator operably coupled to the thermally conductive substrate.

In aspects according to the present disclosure, the thermal assembly includes one or more traces, and the method further includes layering the one or more traces atop an insulator operably coupled to the thermally conductive substrate using sputtering, thermal evaporation, thermal spraying, cathodic arcing, pulsed laser deposition, electro-plating, shadow masking or electron beam deposition.

In aspects according to the present disclosure, two or more insulative substrates are disposed within the interior volume and the method further includes cooperating with a multiplexer or a control algorithm to heat the thermally conductive medium.

In aspects according to the present disclosure, the method further includes modeling one or more of the position, shape, size or temperature of each insulative substrate, thermally conductive substrate or resistive element to customize the treatment effect prior insertion of the expandable bladder into the cervical canal of a patient.

In aspects according to the present disclosure, the method further includes modeling one or more of the position, shape, size and temperature of each insulative substrate, thermally conductive substrate or resistive element based on a presurgical scan.

BRIEF DESCRIPTION OF DRAWINGS

The above and other aspects and features of the present disclosure will become more apparent in view of the following detailed description when taken in conjunction with the accompanying drawings wherein like reference numerals identify similar or identical elements.

DETAILED DESCRIPTION

Referring now to FIG. 1-6, although, U.S. Pat. No. 5,277,201 is incorporated by reference herein in its entirety, only those parts relevant to the present disclosure are discussed below. U.S. Pat. No. 5,443,470 is also incorporated by reference in its entirety herein.

In general, the prior art device is a monopolar electrode system which expands to conform to the endometrial surface to be treated. It passes radiofrequency electric current through the dilated endometrial surface for a time sufficient to destroy the endometrial cells to elevate the temperature of the endometrium to a temperature of from 45° C. to 90° C., within about 10 seconds and maintaining this temperature until the endometrial tissue is destroyed. Optimally, the temperature of the heating is from 55° C. to 65° C. for up to 10 minutes.

The electrical current is passed through or along the surface of the expandable member, the interior of the expandable member being filled with an electrically non-conductive substance such as a fluid. The expandable member can be any material or article which can be compressed or otherwise prepared in a small diameter configuration for insertion through the cervical OS and expanded or inflated after the insertion to provide the dilation. The device is capable of establishing direct electrical connection or capacitive coupling with the endometrium. The other electrical contact is one or more conventional grounding plates or patches which contact a large area of the patient's skin to complete the circuit, e.g., monopolar.

The electric current flowing through the tissue causes resistive heating due to conductance of the tissue. Balloons and/or bladders are used with a single inner fluid chamber as the expandable member which can be compressed or configured in a small diameter for insertion and which will expand or be expanded after insertion to establish the desired electrical contact with the full surface of the endometrium.

Figure 1:
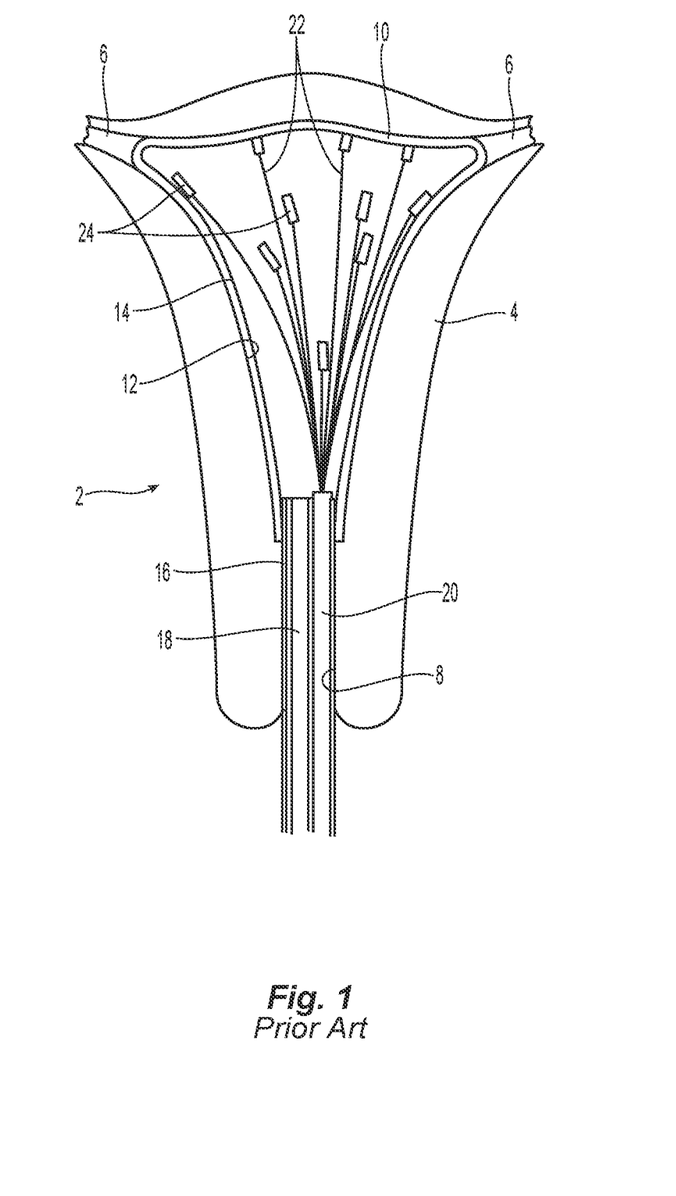
FIG. 1 is a schematic cross-sectional representation of an apparatus of the prior art using an electroconductive balloon as the expandable member.
Figures 2, 3, 4:
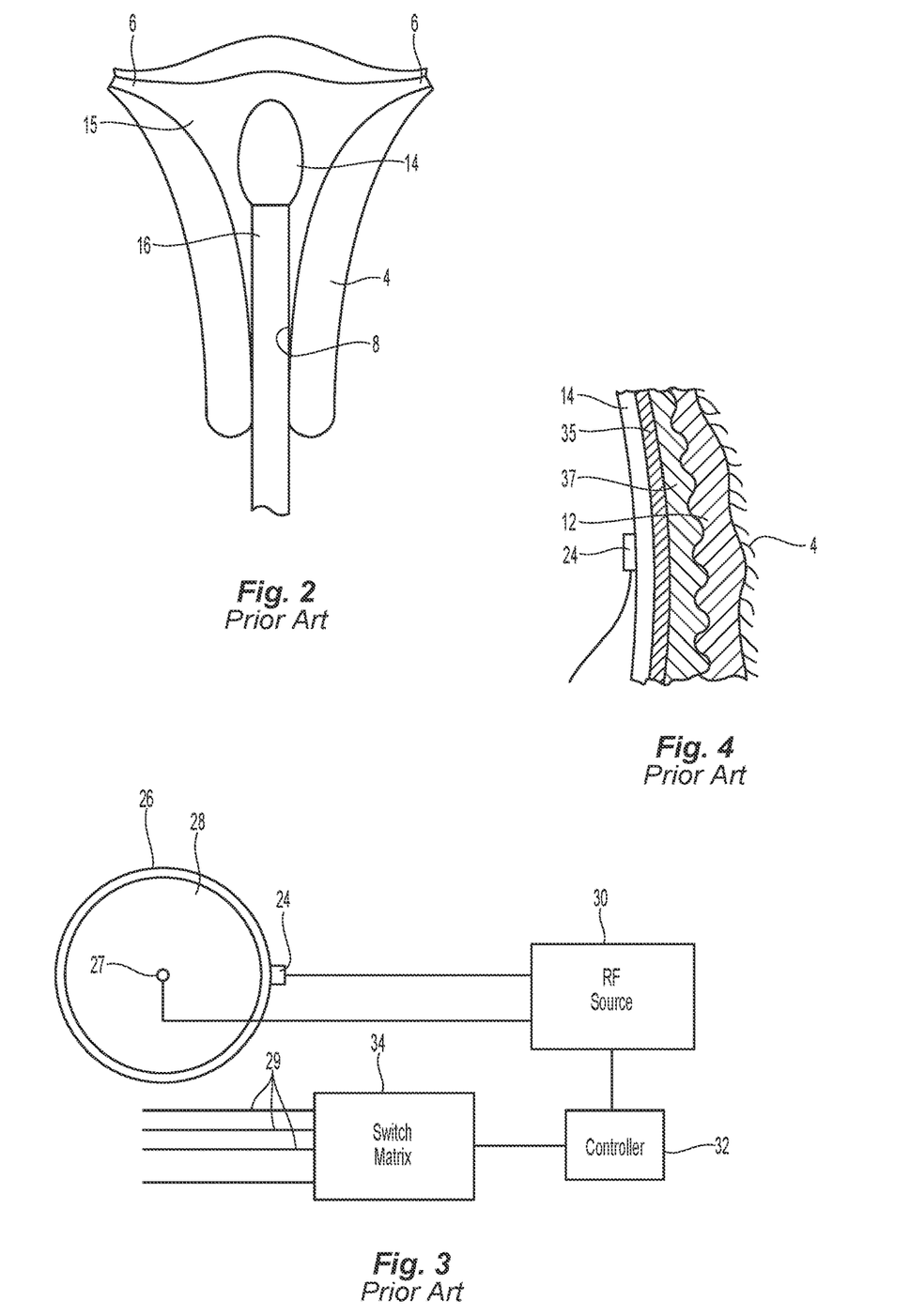
FIG. 2 is a schematic representation of the apparatus of FIG. 1, before inflation of the balloon element.
FIG. 3 is a schematic representation of the power source for the apparatus of FIG. 1.
FIG. 4 is a schematic, enlarged cross-section of the relationship between a small segment of the uterine endometrium and the expandable element of the prior art.

FIG. 1 is a schematic cross-sectional representation of the device using an electroconductive balloon as the expandable member, and FIG. 2 is a schematic representation of the device of FIG. 1, before inflation of the balloon element. The uterus 2 is composed of myometrial tissue 4 surrounding the uterine cavity. The normal uterine cavity or envelope is a flat cavity having approximately the shape of an inverted triangle, the two upper corners communicating with the ovaries by way of the fallopian tubes 6 and the bottom corner opening into the cervical canal or OS 8. The entire surface of this envelope including the entrance to the fallopian tubes 6 and the cervical canal 8 is covered with a thin layer of tissue known as the uterine endometrium 12.

The method includes inserting an electroconductive expandable body such as an inflatable balloon or bladder into the uterine cavity 15 (FIG. 2) and subsequently inflating the balloon with fluid (gas or electrically non-conductive liquid) so that it extends the uterine cavity and conforms to the expanded surface thereof, as shown in FIG. 1. Portions of the balloon 14 extend into the entrance to the fallopian tubes 6 and extend along the entire endometrial surface 12 to the cervical OS 8. The balloon is attached to and forms a fluid-tight seal with the tube 16. Tube 16 encloses a smaller fluid delivery tube 18 and electrical cable 20 containing a single common lead and additional sensor leads, an additional sensor lead being connected to each of a plurality of temperature sensors 24 attached to the inner surface of the balloon. Alternatively, this lead configuration can be replaced by lead pairs 22 for each sensor. The temperature sensors 24 are conventional thermistors or thermocouples and are positioned on zones of the balloon which will contact areas of the endometrial surface with are most sensitive to overheating. Alternatively, the temperature sensors can be fiber optic temperature sensors. The fluid delivery tube 18 is connected to a source of gas or liquid through a conventional fluid control system (not shown).

The balloon includes a thin, non-extensible polymer film such as a polyester or other flexible thermoplastic or thermosetting polymer film, for example, having a conductive metal coating on the outer or inner surface thereof. The films form a non-extensible bladder having a shape and size, in its fully expanded form, which will extend the organ and effect contact with the endometrial lining to be destroyed. The inner surface of the non-extensible bladder can be coated with electroconductive material which will capacitively couple to the endometrium provided that the bladder wall thickness is less than approximately 0.25 mm.

The surface of the expandable member can be an open-cell, porous material such as a foam or similar caged network of material which can hold a quantity of the electroconductive medium "L", paste or gel (for the purposes of the prior art required to secure satisfactory electrical contact with the opposed endometrial surface). The surface is coated with or impregnated with the electroconductive substance.

FIG. 3 is a schematic representation of the power source for the apparatus of FIG. 1. The power source is adapted to provide radiofrequency electric power at a substantially constant amplitude to two electrodes at a frequency which, when current is passed from the balloon through the endometrial lining, will selectively heat the endometrial lining to a temperature within the range of from about 45° C. to about 90° C. and preferably not above 70° C. One electrode 27 is the electroconductive balloon 14 and the other electrode is an external electrode means 26 adapted to contact the outer surface of the body. The conductive balloon 14 forms one electrode 27 of a monopolar radiofrequency (RF) ablation device, the second or indifferent electrode 26 being located external to the body in the form of large surface area patches or plate electrodes. The tissue 28 between the electrodes is exposed and heated by the RF field and current flow created by the electrodes. The temperature sensor 24 and electrodes 26 and 28 are connected to a conventional, controllable RF source 30 and controller 32 such as a signal generator coupled with a power amplifier and a computer controller. The signal generator, power amplifier and computer controller are conventional and non-critical devices in the art. If the temperature sensor is a fiber optic device, it is coupled to the RF source and controller through a suitable conventional interface (not shown) which can convert the optical signal to data readable by the computer controller.

The leads leading to the temperature sensors 24 are connected to the input terminals of switch matrix 34 which can close the circuit with each of the temperature sensors sequentially and/or selectively. If any temperature sensor sampling indicates that a threshold temperature has been exceeded, the controller 32 can reduce or terminate power delivered to the balloon by the RF source 30.

FIG. 4 is a schematic, enlarged cross-section of the relationship between a small segment of uterine endometrium and the expandable balloon element. The endometrial lining 12, supported on the myometrium 4, is usually an irregular surface, even after being extended. The electrical contact between the conductive surface 35 on the outer surface of balloon 14 and the endometrium 12 can be improved by covering the outer surface of the balloon with a conventional electroconductive solution, paste or gel 37 which is physiologically non-toxic and non-irritating.

Figure 5:
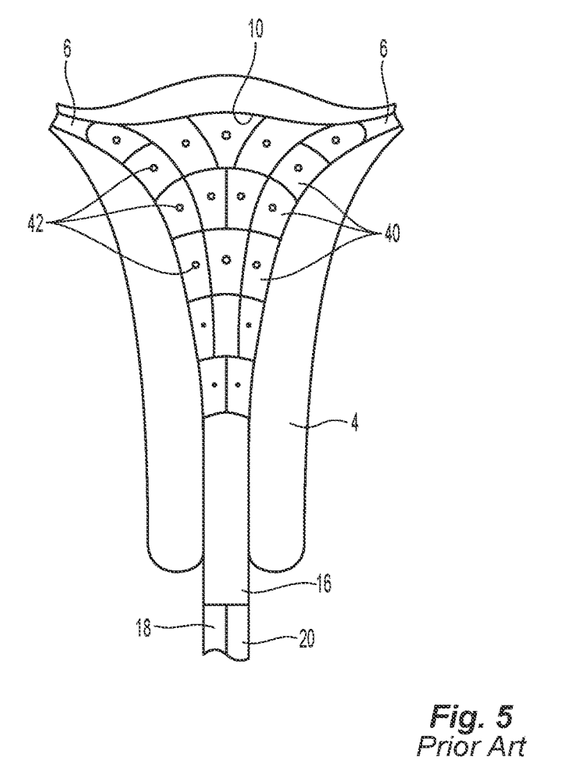
FIG. 5 is a schematic representation of the prior art using a balloon as the expandable member, the balloon having a plurality of surface segments, each with a separate conductive surface and a temperature sensor.

FIG. 5 is a schematic representation of an apparatus of the prior disclosure using a balloon with a plurality of surface segments as the expandable member, each with a conductive surface and a temperature sensor. In this embodiment the balloon or inextensible bladder has a segmented electrode coating of electroconductive metal on either the inner or the outer surface thereof to permit controlled delivery of power to each segment. Each conductive segment 40 is electrically connected through conventional leads (not shown) to the power source. Each conductive segment 40 also has a temperature sensor 42 which is connected through conventional leads (not shown) to the switch matrix. The segmented embodiment shown in FIG. 5 can be used in a monopolar or bipolar mode.

Figure 6:
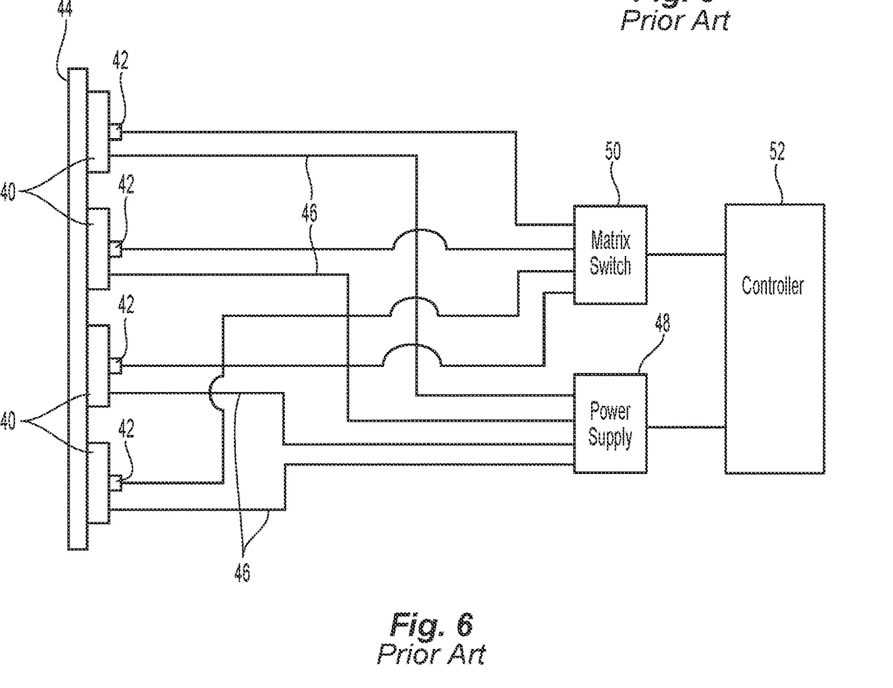
FIG. 6 is a schematic representation of the power source for the multi-segmented balloon shown in FIG. 5.

FIG. 6 is a schematic representation of the power source and switch matrix for the multi-segmented balloon shown in FIG. 5. The surface of the bladder 44 has attached thereto the conductive electrode segments 40 and the temperature sensors 42. Electrical leads 46 separately connect each electrode segment 40 to the power supply 48. Electrical leads 48 separately connect each temperature sensor 42 to the matrix switch 50. In response to the matrix switch, each temperature sensor is sampled, and the signal therefrom is fed to the controller. In response to the controller 52, power is applied to each conductive segment as required to maintain the temperature of the corresponding endometrium segment within the desired range during the treatment. It will be readily apparent to a person skilled in the art that the power can be applied simultaneously, sequentially or any other desired pattern to the electrode segments.

As can be appreciated by the schematic representation of the multi-segmented balloon of FIG. 5 and the power source 48 and matrix switch 50 identified in FIG. 6, the amount of electrical leads 46 and temperature sensors 42 necessary to fine tune the balloon for even heat distribution of the non-electrically conductive fluid and feedback control of the leads 46 can become complicated and lead to design challenges and expense when designing devices for such purposes.

Figure 7:
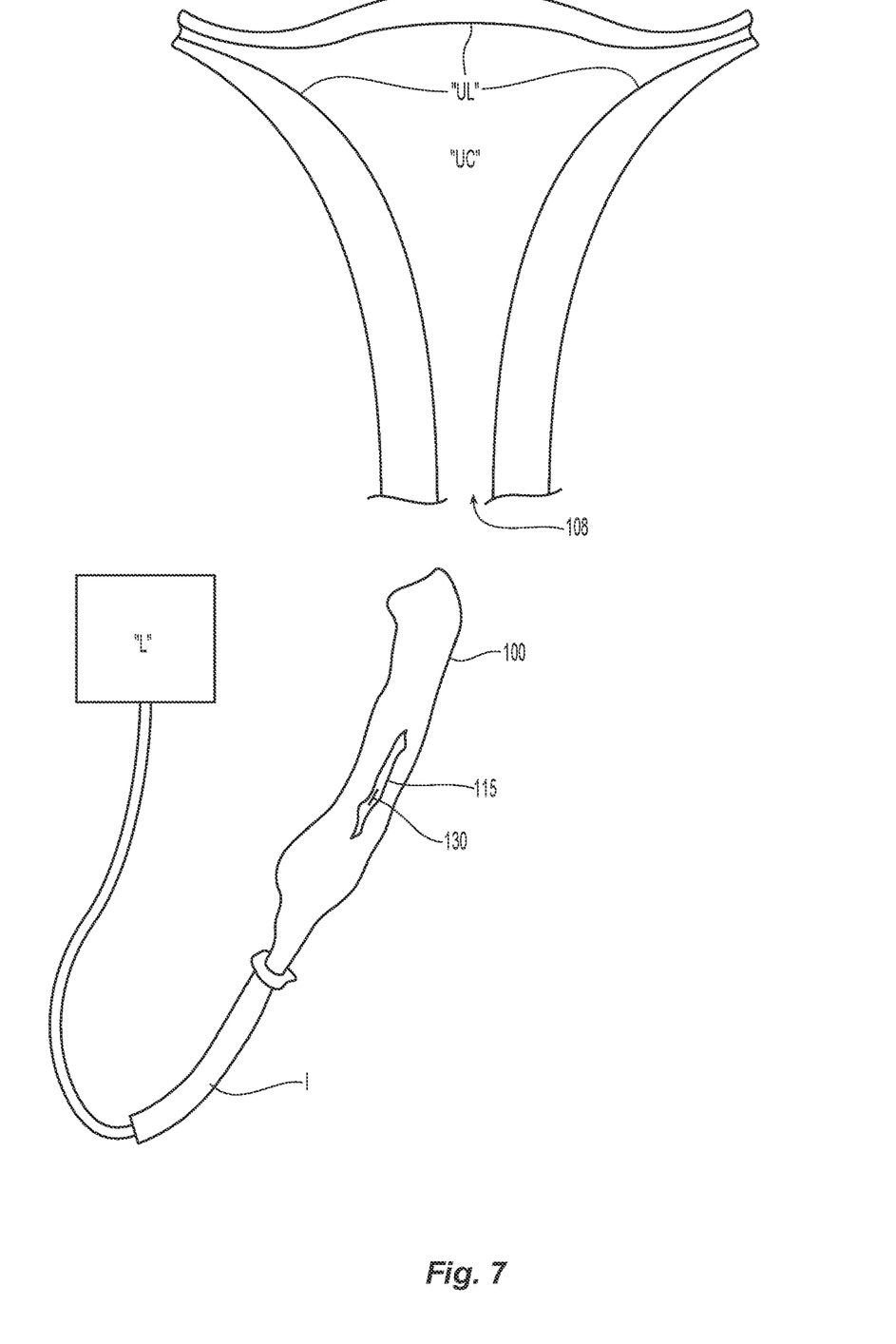
FIG. 7 is a schematic representation of an expandable bladder in accordance with the present disclosure including an insulative substrate having a thermal assembly for insertion within a uterine cavity for treatment of endometriosis.
Figure 8:
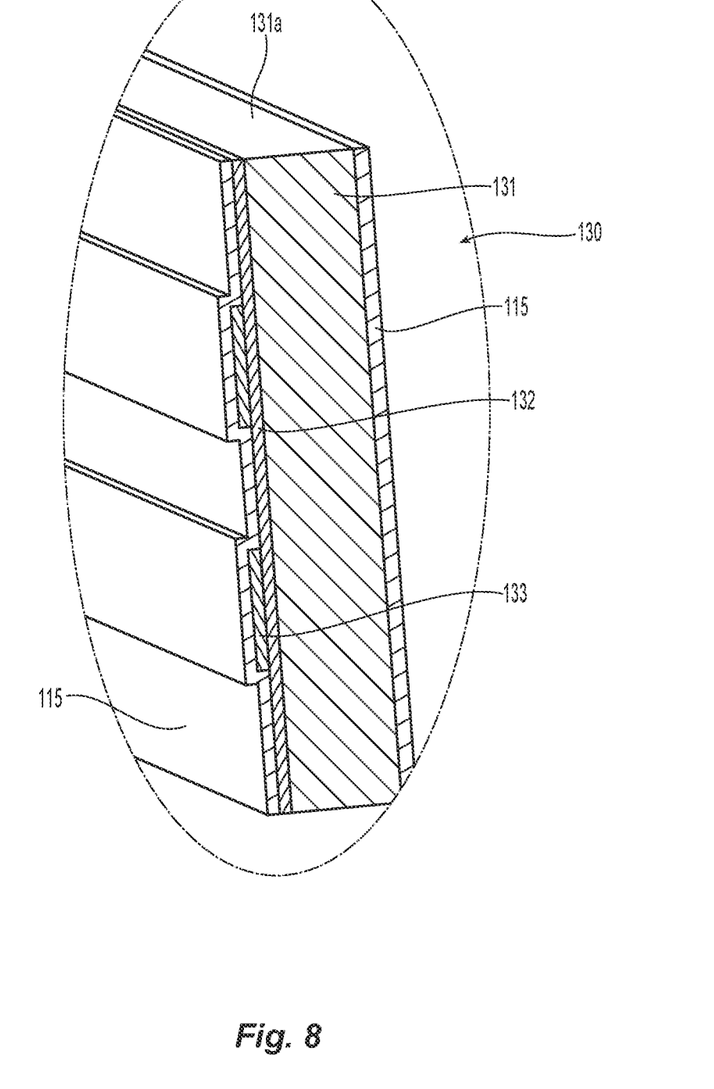
FIG. 8 is an enlarged perspective view of the thermal assembly in accordance with the present disclosure.
Figure 10:
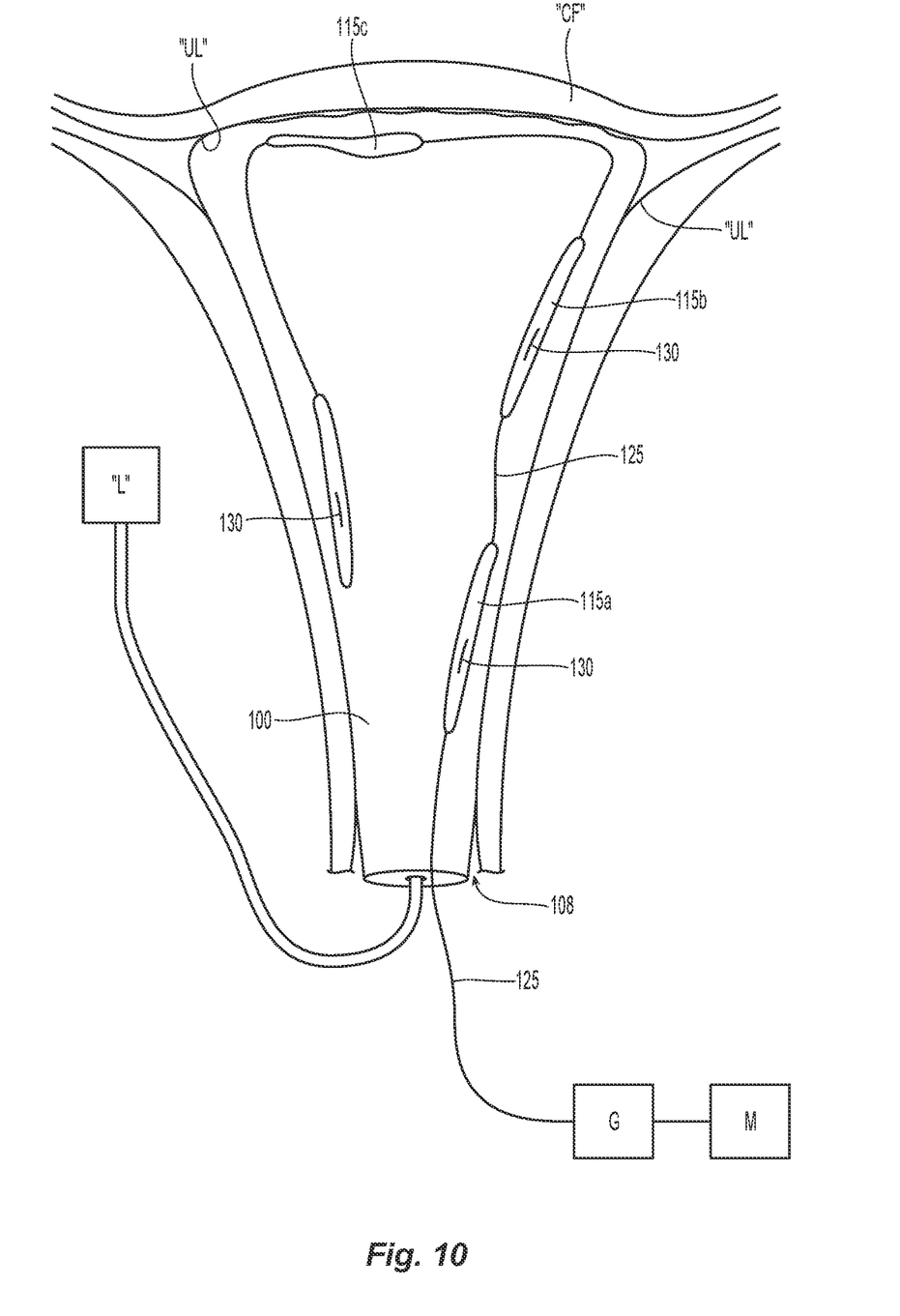
FIG. 10 is a schematic representation of another embodiment of an expandable bladder in accordance with the present disclosure including a plurality of insulative substrates each having a thermal assembly for insertion within a uterine cavity for treatment of endometriosis.

Turning to FIG. 7, an elongated insulative substrate 115 may be utilized to support and electrically isolate a thermal assembly 130 which may be independently activatable to treat tissue as explained in more detail below. The insulative substrate 115 is sized to fit within a selectively expandable balloon 100 configured for selective insertion via an introducer "I" within the cervical OS 108. Once inserted, the balloon 100 may be filled with an electrically non-conductive, thermally conductive medium, e.g., liquid "L", to expand the balloon 100 against the interior of the uterine cavity "UC" as described in detail above. Insulative substrate 115 and thermal assembly 130 may be formed and arranged in any configuration and utilized in a similar manner as described above with respect to the electrodes of FIGS. 1-6 with the exception that temperature sensors 42 (thermistors) are unnecessary as explained below. Insulative substrate 115 may be formed from, for example, ceramic, parylene, glass, nylon, PTFE, or other suitable material(s) (including combinations of insulative and non-insulative materials). FIGS. 7 and 8 detail a single insulative substrate 115 and thermal assembly for heating the conductive fluid "L" and FIG. 10 details utilizing multiple insulative substrates 115 and thermal assemblies 130 for heating the conductive fluid "L". Moreover, FIG. 7 illustrates a collapsed expandable bladder or balloon 100 for insertion within the cervical canal 108 and FIG. 10 illustrates the expandable bladder or balloon 100 expanded within the uterine cavity "UC".

With reference also to FIG. 8, details relating to the thermal assembly 130 are generally defined to include the following elements (described internally to externally): substrate 131 or other internalized bendable metal structure that is both thermally and electrically conductive, e.g., stainless steel, aluminum, etc.; insulator 132 having generally electrically insulative properties and at least partially thermally conductive, e.g., sintered glass, alumina, plasma electrolytic oxidation (PEO anodize), Silica, etc.; resistive element 133 or any metal that is resistive but certain metals may have better thermal coefficients than others; and encapsulant or an electrically insulative materials that is at least partially thermally conductive (may be the same or similar to the insulator). As explained below, the resistive element 133 may be deposited atop insulator 132 via sputtering or the like.

Figure 9:
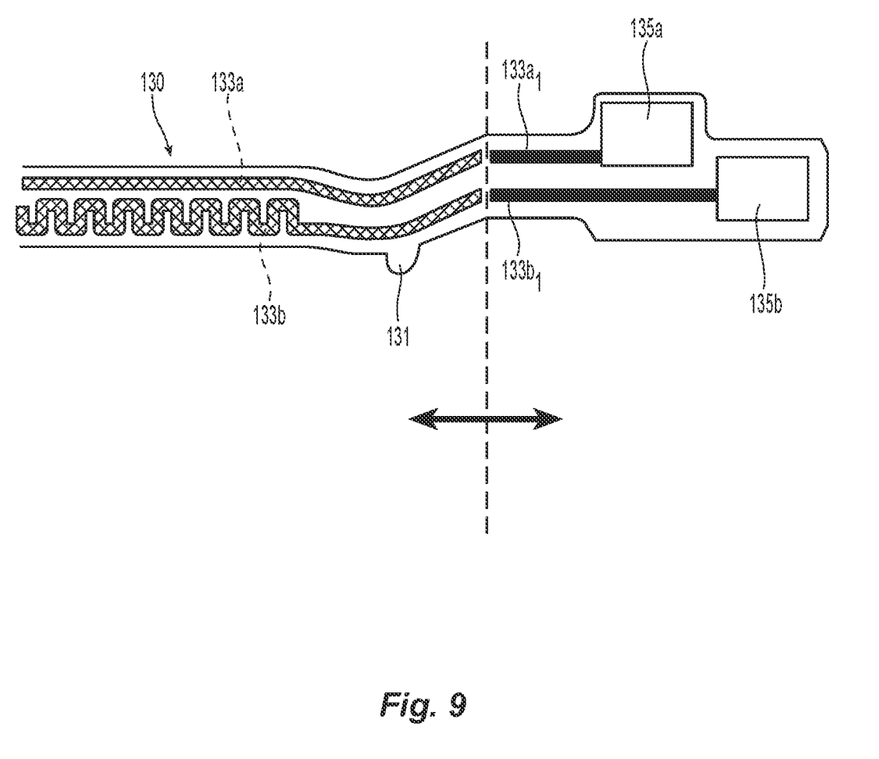
FIG. 9 is an enlarged, side view of the thermal cutting assembly showing a resistive element or trace disposed on a side of an insulator.

FIG. 9 shows a side view of thermal assembly 130 and the electrical connections associated therewith. Generally, electrically conductive pads 135a, 135b connect to opposite ends 133a, 133b of resistive element 133 via traces 133a1, 133b1 which are electrically conductive traces (low resistance/low heat). As explained in detail below, resistive element 133 is configured to rapidly generate heat due to high resistive properties when electrical current is passed therethrough.

Thermal assembly 130 is surrounded by the insulative substrate 115 to electrically isolate thermal assembly 130. As mentioned above, thermal assembly 130 may include an encapsulant that may act in conjunction with or in lieu of insulative substrate 115. Encapsulant (and insulator 132 as shown in FIG. 8) is configured cover the sides of the substrate 131 leaving an edge 131a of the substrate 131 exposed to the conductive medium "L". In this instance and due to the electrically insulative properties of insulator 132, only thermal energy is conducted to substrate 131 and, in turn, to conductive medium "L".

Turning back to the thermal assembly 130 and the various methods of manufacturing the same, it is contemplated that the resistive element 133 of the thermal assembly 130 may be manufactured in thin layers that are deposited atop (or otherwise) insulator 132 which is disposed atop substrate 131. For the purposes herein, the resistive element 133 will be described as being deposited onto insulator 132, knowing that insulator 132, in turn, may be disposed on one or both sides of substrate 131. For example, it is contemplated that resistive element 133 may be deposited onto the insulator 132 via one or more of the following manufacturing techniques: sputtering, thermal evaporation, thermal spraying, cathodic arcing, pulsed laser deposition, electron beam deposition. Other techniques may include: electroless strike or plating and electro-plating, shadow masking.

Utilizing one or more of these techniques provides a thin layer of thermally conductive resistive material which has the benefit of dissipating heat quickly compared to a traditional thermal assembly 130. Other advantages of thin-layered resistive elements 133 on the thermal assembly 130 include: the ability to heat up quickly, the ability to require less energy to heat up and maintain heat in a reduced timeframe compared to traditional electrical heaters.

Any one of the following materials (or combinations thereof) may be utilized as the resistive element 133: aluminum, copper, chromium, titanium, stainless steel, nickel, chrome, tin, platinum, palladium, gold, nichrome, and Kanthal. It is contemplated that during manufacturing, combinations of materials may be utilized for a particular purpose or to achieve a particular result. For example, one material may be utilized as a base conductor with a second material used as an outer or inner conductor to act as the heating element. Additional techniques or materials may be added to act as thermal assemblies 130 or resistive elements 133 such as those described with reference to U.S. patent application Ser. No. 16/785,347 filed Feb. 7, 2020, U.S. Provisional Patent Application Ser. No. 62/952,232 filed Dec. 21, 2019, U.S. patent application Ser. No. 16/838,551 filed Apr. 2, 2020, and U.S. patent application Ser. No. 16/518,016 filed Jul. 22, 2019, the entire contents of each of which being incorporated by reference herein.

In other embodiments, materials may be mixed during the application process. In some embodiments, the material used (e.g., Aluminum, copper etc.,) may be thin and still promote a good heating effect while other materials may have to be thicker to produce the same or similar heating effect due to the particular material's level of electrical resistance. In this latter instance, a highly conductive base material may be utilized with the thinner, less conductive material more resistive material to produce a desired effect.

In embodiments, a biocompatible material (not shown) may be utilized to cover a non-biocompatible material. In other embodiments, the materials may be deposited (or otherwise disposed on insulator 132 in non-uniform layers while still allowing for transitions, e.g., side-to-side transitions. The materials could be deposited (or otherwise disposed on insulator 132) in an alternating fashion and more than one electrical circuit may be employed.

Examples of resistive elements 133 that may be used for thermal assemblies 130 may include single layer resistive elements 133 in the range of about 0.1 micron to about 500 microns. A so-called "thick" film resistive element 133 would be about 30 microns and a "thin" film resistive element 133 would be about 1 micron. Non-conductive, electrically transparent, thermally transparent, or electrically and/or thermally porous materials may also be layered in a similar fashion atop, below or between the resistive elements 133. One or more of these materials may be layered atop the resistive elements 133 to complete the thermal assembly 130 as mentioned above within a specified range.

Thermal assembly 130 is configured to connect to an electrosurgical generator "G" and a switch 90 to enable selective activation of the supply of energy to thermal assembly 130 wherein the resistive element(s) 133, in turn, heats edge 131a of substrate 131 to thermally conduct heat to a conductive medium. In aspects, the resistive element(s) 133 are activated to thermally conduct heat to the substrate 131 which heats the conductive medium "L" disposed within the balloon 100 to a desired temperature or temperature range to treat endometriosis on the uterine lining "UL" (FIG. 7) for a specified time period, e.g., within the range from about 45° C. to about 90° C. and maintain this temperature until the endometrial tissue is destroyed, e.g., up to 10 minutes. In aspects, the resistive element 133 heats edge 131a of substrate 131 to thermally heat the conductive medium, e.g., liquid or fluid "L", to a desired temperature range within the range from about 55° C. to 65° C. for up to 10 minutes. As can be appreciated and compared to electrodes, the resistive elements 133 rapidly increase temperature profiles and can be configured to effectively and uniformly conduct thermal energy to the conductive medium "L" to treat the uterine lining "UL" very efficiently. Moreover, only thermal energy is transferred to the surrounding uterine walls eliminating ground plates and other safety concerns with electrosurgical energy.

As mentioned above and as shown in FIG. 10, multiple insulative substrates 115a, 115b, 115c may be wired together via leads 125 in series or parallel and coupled to the generator G and independently or simultaneously activated to heat the conductive medium "L". A multiplexer "M" (or control algorithm) may be utilized to control activation and sequencing of the insulative substrates 115a, 115b, 115c. Any number of insulative substrates 115 may be utilized of any size and any configuration such that, after insertion of the balloon 100 into the cervical OS 108 and upon expansion via the introduction of the conductive medium "L", the dispersion of insulative substrates 115a, 115b, 115c is relatively consistent to effectively heat the conductive medium "L" efficiently and effectively to treat the uterine lining "UL".

The size, shape and material of the balloon 100, the type of conductive medium "L" and the number and configuration of insulative substrates 115 may all be customized depending upon particular surgical purposes or to meet particular surgical conditions. Moreover, the thermal assembly 130 of each insulative substrate, e.g., insulative substrate 115a versus insulative substrate 115b, may differ in size and/or configuration depending upon a particular surgical purpose or to achieve a particular or customized surgical result, e.g., endometriosis in the uterine lining at the cervical fundus "CF" may be thicker requiring a slightly higher temperature profile in that area of the balloon 100.

In aspects according to the present disclosure, a surgeon may be model the size, position, shape and temperature (or temperature range) of each insulative substrate 115, i.e., plan a surgical algorithm to control the temperature (or temperature range) of each insulative substrate 115 based on an ultrasound or other type of presurgical scan, and see the effects of the conductive fluid "L" on the uterine lining "UL" to determine the necessary timeframe to effectively treat the endometriosis in advance of the surgical procedure. The thermal assembly 130 or any parts thereof may also be customizable in a similar manner.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A device for endometrial ablation, comprising:
a selectively expandable bladder configured for insertion through a cervical canal of a patient and into a patient's cervix, the selectively expandable bladder defining an interior volume for receiving a thermally conductive medium which, when introduced into the interior volume, expands the selectively expandable bladder against the uterine tissue of the cervix; and
a plurality of insulative substrates operably disposed within the interior volume and supporting a thermal assembly on at least one of the plurality of insulative substrates, the thermal assembly adapted to couple to an energy source and configured to conduct thermal energy to a thermally conductive substrate upon activation of the thermal assembly, which, in turn, heats the thermally conductive medium in contact with the thermally conductive substrate to treat the uterine tissue of a patient,
wherein the plurality of insulative substrates is disposed within the interior volume and cooperates with a multiplexer or control algorithm to heat the thermally conductive medium, and
wherein a shape or size of at least one of the plurality of insulative substrates is different than a shape or size of another of the plurality of insulative substrates to customize a treatment effect.

2. The device for endometrial ablation according to claim 1, wherein the thermally conductive medium is heated to a temperature within the range of about 45° C. to about 90° C. for a specified time period.

3. The device for endometrial ablation according to claim 1, wherein the thermally conductive medium is heated to a temperature within the range of about 55° C. to about 65° C. for about 10 minutes.

4. The device for endometrial ablation according to claim 1, wherein the thermal assembly includes at least one resistive element in thermal communication with the thermally conductive substrate and electrical communication with the energy source.

5. The device for endometrial ablation according to claim 4, wherein the at least one resistive element includes at least one trace composed of aluminum, copper, silver, chromium, titanium, stainless steel, nickel, chrome, tin, platinum, palladium, gold, nichrome, and a ferritic iron-chromium-aluminum alloy.

6. The device for endometrial ablation according to claim 5, wherein the at least one trace is layered and electrically encapsulated atop an insulator operably coupled to the thermally conductive substrate.

7. The device for endometrial ablation according to claim 5, wherein the at least one resistive element includes at least two traces layered atop one another and electrically encapsulated atop an insulator operably coupled to the thermally conductive substrate.

8. The device for endometrial ablation according to claim 5, wherein the at least one trace is layered atop an insulator operably coupled to the thermally conductive substrate using sputtering, thermal evaporation, thermal spraying, cathodic arcing, pulsed laser deposition, electro-plating, shadow masking or electron beam deposition.

9. A method for treating endometriosis, comprising:
inserting an expandable bladder into a cervical canal of a patient in a collapsed condition and into a patient's cervix;
introducing a thermally conductive medium into an interior volume of the expandable bladder to expand the bladder against the interior walls of the uterine lining of the patient's cervix;
activating an energy source to energize a thermal assembly to conduct thermal energy to a plurality of insulative substrates disposed within the interior volume of the expandable bladder including a thermally conductive substrate such that thermal energy is transferred to the conductive medium in contact with the thermally conductive substrate to treat the uterine tissue; and
modeling at least one of a position, shape, size, or temperature of at least one of the plurality of insulative substrates to customize a treatment effect prior to insertion of the expandable bladder into the cervical canal of the patient.

10. The method for treating endometriosis according to claim 9, further comprising: heating the conductive medium to a temperature within the range of about 45° C. to about 90° C. for a specified time period.

11. The method for treating endometriosis according to claim 9, further comprising:
heating the conductive medium to a temperature within the range of about 55° C. to about 65° C. for about 10 minutes.

12. The method for treating endometriosis according to claim 9, wherein the thermal assembly includes at least one resistive element in thermal communication with the thermally conductive substrate and electrical communication with the energy source.

13. The method for treating endometriosis according to claim 12, wherein the at least one resistive element includes at least one trace composed of aluminum, copper, silver, chromium, titanium, stainless steel, nickel, chrome, tin, platinum, palladium, gold, nichrome, and a ferritic iron-chromium-aluminum alloy.

14. The method for treating endometriosis according to claim 9, wherein the thermal assembly includes at least one trace and wherein the method further comprises:
   layering and electrically encapsulating the at least one trace atop an insulator operably coupled to the thermally conductive substrate.

15. The method for treating endometriosis according to claim 9, wherein the thermal assembly includes at least one trace and wherein the method further comprises:
   layering the at least one trace atop an insulator operably coupled to the thermally conductive substrate using sputtering, thermal evaporation, thermal spraying, cathodic arcing, pulsed laser deposition, electro-plating, shadow masking or electron beam deposition.

16. The method for treating endometriosis according to claim 9, wherein the plurality of insulative substrates is disposed within the interior volume, the method further comprising:
   cooperating with a multiplexer or a control algorithm to heat the thermally conductive medium.

17. The method for treating endometriosis according to claim 9, further comprising:
   modeling at least one of the position, shape, size and temperature of each of the plurality of insulative substrates based on a presurgical scan.

18. A method for treating endometriosis, comprising:
   inserting an expandable bladder into a cervical canal of a patient in a collapsed condition and into a patient's cervix;
   introducing a thermally conductive medium into an interior volume of the expandable bladder to expand the bladder against the interior walls of the uterine lining of the patient's cervix;
   activating an energy source to energize a thermal assembly to conduct thermal energy to a plurality of insulative substrates disposed within the interior volume of the expandable bladder including a thermally conductive substrate such that thermal energy is transferred to the conductive medium in contact with the thermally conductive substrate to treat the uterine tissue; and
   modeling at least one of a position, shape, size or temperature of at least one of the plurality of insulative substrates based on a presurgical scan.

* * * * *